Whitaker and Read
Mower
No. 897
Reissued. Feb. 7. 1860.
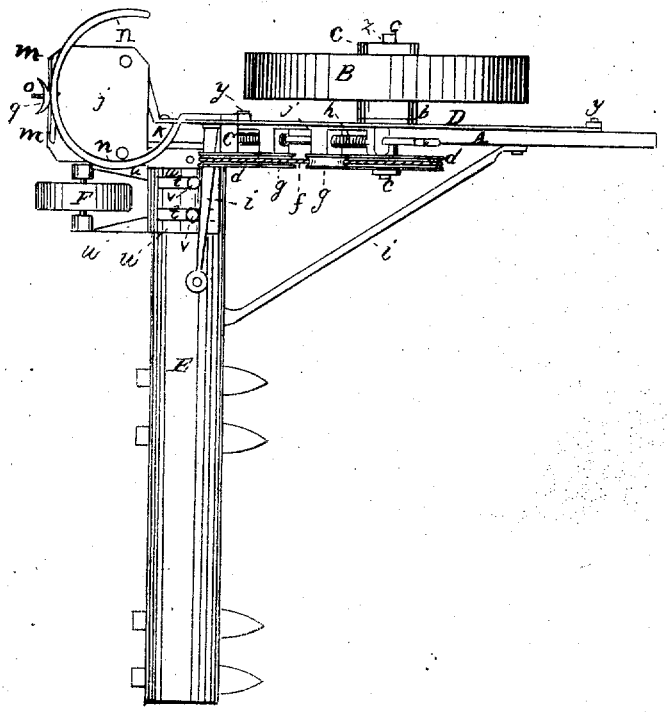
Fig. 2
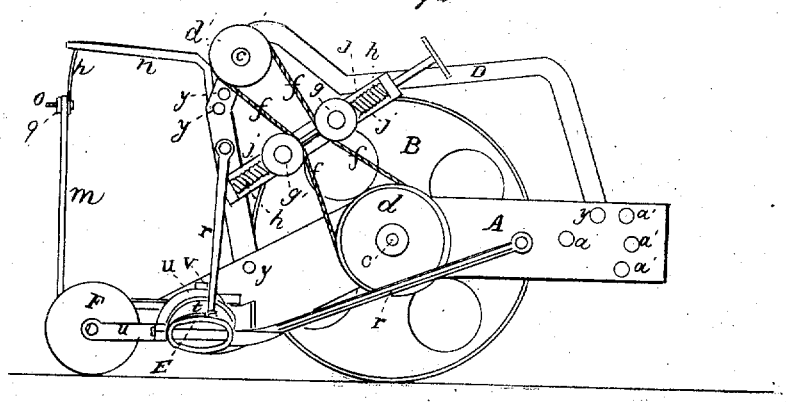
Witnesses
Wm. H. Brereton
John T. Whitaker
Calvin D. Read

BEST AVAILABLE COPY

UNITED STATES PATENT OFFICE.

J. T. WHITAKER AND C. D. READ, OF ST. CHARLES, ILLINOIS.

IMPROVEMENT IN REAPING AND MOWING MACHINES.

Specification forming part of Letters Patent No. 17,990, dated August 11, 1857; Reissue No. 897, dated February 7, 1860.

DIVISION B.

*To all whom it may concern:*

Be it known that we, JOHN T. WHITAKER and CALVIN D. READ, of St. Charles, in the county of Kane and State of Illinois, have invented a certain new and useful Improvement in Reaping and Mowing Machines, of which the following is a full, clear, and exact description, reference being had to the accompanying drawings, making part of this specification, in which—

Figure 1 represents a plan of a partial reaping-machine having our improvements applied thereto, and Fig. 2 an elevation of the same.

Our improvement which forms the subject of the present patent consists in a new and improved arrangement and combination of the raker's seat or stand with a supporting-wheel and the frame and finger-bar of the machine, by means of which the weight of the raker is made to support and counterbalance the weight and leverage of the outer end of the finger-bar and platform without the use of a supporting-wheel on the outside, thereby lessening the drag and equalizing the draft of the machine.

To enable others skilled in the art to make, construct, and use our invention, we will now proceed to describe its parts in detail.

The machine to which our improvements are applied, as represented in the drawings, consists of a tubular finger-bar secured to a single frame-beam by means of a stud secured to or formed on the beam, which takes into the hollow finger-bar, where it is held firmly in place, either by being shrunk on or bolted or riveted to it. The frame-beam A is supported on the driving-wheel B by a stud secured to its outer side, in which the wheel is mounted. Through this stud and the beam A is passed a shaft, *c*, upon the inner end of which a pulley, *d*, is secured, that gives motion to the pulley *d'* of the reel. This shaft is made to project through the stud *b*, and has a square shoulder formed on that end, on which a washer, *e*, fits, having projections on its inner surface, which take into corresponding depressions formed in the end of the hub of the driving-wheel B, and which is made slightly longer than the stud *b*, so that as the washer *e* of the shaft *c* is tightened to the hub of the wheel by the screw-nut *z* the shaft is made fast to wheel B without impinging upon the end of the stud, thus causing the shaft to rotate with the wheel and communicate motion to the reel through the pulleys *d d'* and belt *f*, this belt being tightened or loosened at pleasure by means of pulleys *g* and *g'*, mounted on a right and left hand screw, *h*, and traveling in a guide-frame, *j*, by simply turning the screw in the required direction.

The finger-bar E is braced to the frame A and reel-support by rods *i* and *i'*, in this way preventing lateral or vertical deflection, and giving great strength and rigidity to the machine.

To the rear end of the beam A is secured a small frame, *k*, to which the stand *l*, that supports the raker, is fastened. From the rear end of this platform rise two standards, *m m*, which connect at the top in such manner as to form a bent or curved bar, whose ends are secured in the raker's platform *l*. To the upper side of this curved bar is secured a rest or breast-support, *n*, for the raker, by means of a screw-bolt, *o*, passing through a slot in the standard *p* of the rest *n*, and a wing-nut, *g*. One end of the rest is secured to the standard or reel-bearer D, thus giving to the rest a firm support. The rest *n* is made adjustable by means of the slot and bolt before described, so as to adapt it to the various heights of rakers using it.

Upon the end of the finger-bar next the main frame or driving-wheel B is secured a plate, *t*, whose under side conforms in shape to that of the upper side of the finger-bar, (which is slightly flattened, its transverse section being oval,) while its upper or convex side forms the arc of a circle, or nearly so. Upon this plate is formed the frame *u* of a wheel, F, for the support of the finger-bar, to which it is attached by means of the bolts *v v*, which pass through the finger-bar and slots cut in the frame. This wheel serves to support the rear end of the machine, and also to raise and lower the finger-bar as required, the latter being effected by means of the slot and screw-bolts and the curved form of its frame and finger-bar, thereby permitting the frame to turn on the latter, and thus regulate the height of the finger-bar from the ground. This wheel is arranged between the raker's seat or stand and the outer end of the finger-bar, and as it supports both it acts as a fulcrum, by means of which the weight of the raker on the stand is enabled to counterbalance the weight or leverage of the finger-bar, and in this way avoid the use of an outside supporting-wheel, which causes great side drag in the machine.

Having thus described our invention, what we claim as new, and desire to secure by Letters Patent, is—

The peculiar arrangement and combination of the raker's seat or stand *l* and wheel F with the finger-bar and frame A, whereby the weight of the raker is made to counterbalance the weight of the outer end of the latter platform and frame, substantially as set forth.

In testimony whereof we hereunto set our hands.

JOHN T. WHITAKER.
CALVIN D. READ.

Witnesses:
ALEX. V. SILL.
T. H. COLLINS.